US011558366B2

(12) United States Patent
Woland et al.

(10) Patent No.: US 11,558,366 B2
(45) Date of Patent: Jan. 17, 2023

(54) ACCESS TO SECURED NETWORKS FOR KNOWN ENTITIES

(71) Applicant: Cisco Technology, Inc., San Jose, CA (US)

(72) Inventors: Aaron T. Woland, Waxhaw, NC (US); Adam J. O'Donnell, San Francisco, CA (US); Vivek Santuka, Morrisville, NC (US); Stephen M. Orr, Wallkill, NY (US)

(73) Assignee: Cisco Technology, Inc., San Jose, CA (US)

( * ) Notice: Subject to any disclaimer, the term of this patent is extended or adjusted under 35 U.S.C. 154(b) by 487 days.

(21) Appl. No.: 16/172,694

(22) Filed: Oct. 26, 2018

(65) Prior Publication Data
US 2020/0137036 A1 Apr. 30, 2020

(51) Int. Cl.
H04L 9/32 (2006.01)
H04L 9/40 (2022.01)
H04W 12/08 (2021.01)

(52) U.S. Cl.
CPC .......... H04L 63/083 (2013.01); H04L 9/3263 (2013.01); H04L 63/102 (2013.01); H04W 12/08 (2013.01)

(58) Field of Classification Search
None
See application file for complete search history.

(56) References Cited

U.S. PATENT DOCUMENTS

| 7,159,116 | B2 | 1/2007 | Moskowitz | |
| 9,112,861 | B2 * | 8/2015 | Menezes | H04L 63/0884 |
| 9,843,572 | B2 * | 12/2017 | Rykowski | H04L 63/0823 |
| 10,057,813 | B1 | 8/2018 | Likar et al. | |
| 2006/0026670 | A1 * | 2/2006 | Potter | G06F 21/31 726/7 |
| 2007/0160017 | A1 | 7/2007 | Meier et al. | |
| 2009/0222657 | A1 * | 9/2009 | Bender | H04L 9/3268 713/156 |
| 2012/0284785 | A1 | 11/2012 | Salkintzis et al. | |
| 2013/0073856 | A1 * | 3/2013 | Sherkin | H04L 9/006 713/176 |
| 2013/0212653 | A1 * | 8/2013 | Hoghaug | G06F 21/34 726/5 |
| 2018/0220471 | A1 * | 8/2018 | Upp | H04W 12/069 |
| 2018/0288614 | A1 | 10/2018 | Zaks et al. | |
| 2019/0132317 | A1 * | 5/2019 | Berezin | H04L 63/10 |

* cited by examiner

Primary Examiner — Fatoumata Traore
(74) Attorney, Agent, or Firm — Patterson + Sheridan, LLP

(57) ABSTRACT

Techniques for connecting known entities to a protected network are described. A user device with a certified application installed is authenticated with an identification repository. The authentication is accomplished using credentials associated with the certified application. The user device is also enrolled with an authentication server and the authenticated user device is connected to the protected network.

20 Claims, 10 Drawing Sheets

US 11,558,366 B2

ACCESS TO SECURED NETWORKS FOR KNOWN ENTITIES

TECHNICAL FIELD

Embodiments presented in this disclosure generally relate to providing access to secure networks to known or registered client devices. More specifically, embodiments disclosed herein provide for authenticating and enrolling a user device to an authentication server, and connecting the authenticated and enrolled user device to a protected network.

BACKGROUND

Customers and consumers require a secure mechanism for joining wireless networks while reducing user interruptions and user interactions in order to provide a better user experience. Various methods exist to reduce the number of user interactions and automate parts of a connection process to allow a user's device to connect to secure wireless networks at multiple remote access points. However, for enterprise type networks, the various existing secure methods and mechanisms create extra identification and authentication steps for the user, even when the user has logged into the secured network many times before. This often leaves a user logging in multiple times on devices, such as mobile phones, using constrained user interfaces that prevent the user from accurately and quickly entering authentication information. Users may have to repeatedly enter login information both when reconnecting to previously connected networks and when the user has an ongoing connection, but the connection credentials timeout resulting in manual re-authentication from the user. This creates an interaction intensive and frustrating experience for the user.

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
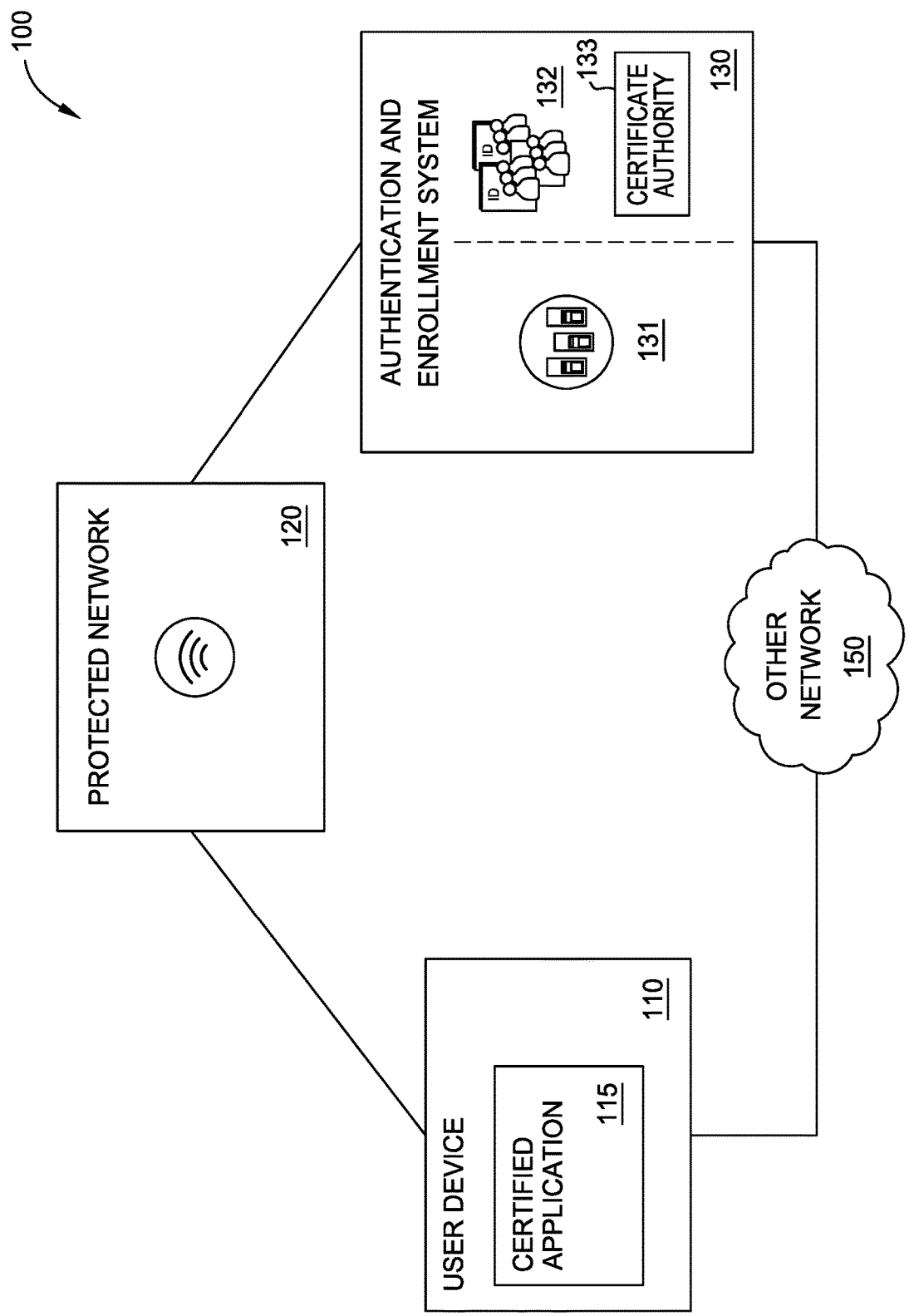
FIG. 1 illustrates a networking system, according to one embodiment.

One embodiment presented in this disclosure is a method for connecting a user device to a protected network. The method includes authenticating the user device, at an authentication server, using credentials associated with a certified application on the user device. The credentials include a username and password to access the certified application. Upon authenticating the user device the method continues by connecting the user device to the protected network, and enrolling the user device with the authentication server and issuing an identity certificate to the user device. The identity certificate is used by the user device to authenticate the user device in subsequent attempts to connect to the protected network.

Another embodiment presented in this disclosure is a system for connecting a user device to a protected network. The system includes a processor and a memory comprising instructions which, when executed on the processor, performs an operation. The operation includes authenticating the user device, at an authentication server, using credentials associated with a certified application on the user device. The credentials include a username and password to access the certified application. Upon authenticating the user device the operation continues by connecting the user device to the protected network, and enrolling the user device with the authentication server and issuing an identity certificate to the user device. The identity certificate is used by the user device to authenticate the user device in subsequent attempts to connect to the protected network.

Another embodiment presented in this disclosure is a computer program product for connecting a user device to a protected network. The computer program product comprising a non-transitory computer-readable medium program having program instructions embodied therewith, the program instructions executable by a processor to perform an operation. The operation includes authenticating the user device, at an authentication server, using credentials associated with a certified application on the user device. The credentials include a username and password to access the certified application. Upon authenticating the user device the operation continues by connecting the user device to the protected network, and enrolling the user device with the authentication server and issuing an identity certificate to the user device. The identity certificate is used by the user device to authenticate the user device in subsequent attempts to connect to the protected network.

EXAMPLE EMBODIMENTS

Secure connections from devices, such as user devices, to networks are required in many cases in order to provide reliable and secure connections. These secure connections are best accomplished in secure protected networks, such as a password protected Wi-Fi network. In many instances, the process to join a protected network requires a user to obtain credentials to access or log into the protected network. For example, an enterprise network for an entity (e.g., a multi-site corporation, hotel chain, retail chain, university, etc.) may require each of the users of the network (e.g., employees, customers, student, or other users) to obtain an identity of the protected network, such as a service set identifier (SSID) for a protected Wi-Fi network and login credentials, such as a username and password to access the protected network. In many cases, those employees, customers, and/or other users may have to attempt to enter the obtained credentials on devices that do not provide an easy or efficient method to access an authentication portal and enter the credentials. For example, a customer of a retail business attempting to log into a protected network on a mobile phone may be redirected several times through various login screens while attempting to log into the network. When this customer goes to another location associated with the business, he may then be required to go through a similar process to log into the protected network on his mobile phone. Additionally, as the customer is connected to the protected network, various timeouts and re-authentication requirements may occur on the network, which in turn require the customer to again go through a login process.

Even for methods that provide for some automation or automatic connection to enterprise type networks, the various existing methods and mechanisms create extra identification and authentication steps for the user even when the user has logged into the secured network many times before. In some methods, a device may be automatically connected based on a device identity (e.g., a subscriber identity module (SIM)). However, in these methods, a service provider identifies the SIM and provides the connection. In many cases, the enterprises that may want to provide a protected network do not have access to the SIM and/or cannot identify the user associated with the SIM device. Protected network providers want a connection method that allows the providers to identify and track the users connected to the network, not just the device identity. When the enterprises are able to identify and track the users connected to the network they are able to collect customer specific information and target services to the identified connected customer. For example, a hotel may provide an automatic high speed internet connection to a customer with a loyalty status and/or provide a lower speed or paid internet connection to customers without a loyalty status. Additionally, identifying the customers connected to the network will allow enterprises such as retail locations to track the amount of time the customer spends in the retail location, the areas the customer spends their time, and what the customer purchases.

According to the embodiments described herein, the entity providing the network (network provider) may provide automatic connection to protected networks by leveraging the identity information the entity has associated with the user of the device. For example, the network provider may utilize the credentials associated with an employee identification and/or a customer identification, such as a loyalty program, to identify the user of the device and then utilize a certified application on the device to install network connection configurations in order to connect the device to a protected network. This allows the network provider to identify both the device connected to the network and the user of the device.

FIG. 1 illustrates a networking system, according to one embodiment. As shown, FIG. 1 includes the networking system 100 which includes a user device 110, where the user device includes an installed certified application 115. In some examples, the user device 110 may include a mobile phone, a tablet, a laptop, or other computing device capable of connecting to a protected network. In some examples, the certified application is an installed or preinstalled application that can modify network configurations. In some examples, the certified application must be signed with an appropriate application certificate in order to modify the network configurations of the user device 110. The certified application interacts with a user to receive user credentials for the certified application. The certified application can also, at least, configure login settings of the user device 110, such as installing 802.11u configurations on the user device 110. In some examples, the certified application 115 may comprise a customer focused application, such as a shopping application for a retail chain and/or a loyalty application, such as a customer loyalty application for a hotel chain.

As shown in FIG. 1, the user device 110 includes mechanisms such as radio antennas etc. to connect to one or more networks including a protected network 120 and other network 150. The protected network 120 may comprise a protected Wi-Fi network. In some examples, the protected network 120 is an enterprise network including a plurality of access points located in distinct locations, such as spread across multiple retail locations, campuses, chain locations, etc. The user device 110 may also be connected to the other network 150. Other network 150 may include a wireless/mobile network, such as a long term evolution (LTE) network or other type of network such as a Wi-Fi network. In an example where other network 150 is a Wi-Fi network, the Wi-Fi network may be unprotected and/or the user device 110 may use a standard login method to access other network 150. In one example, other network 150 may comprise a user of user device 110's home network and/or mobile network.

As also shown in FIG. 1, the networking system 100 also includes an authentication and enrollment system 130 (system 130). The user device 110 can connect and/or communicate to components of the system 130 through the other network 150. The user device can also connect and/or communicate to components of the system 130 through the protected network 120, as described herein. In general the system 130 performs the functions described herein to connect a user device to a protected network. In order to perform the functions, system 130 includes authentication module 131, identification module 132, and certificate authority 133 which are described in more detail later. In some examples, the authentication module is accessed only through the protected network 120 (e.g., when the authentication module is embodied as a Remote Authentication Dial-In User Service (RADIUS) server).

Figure 2:
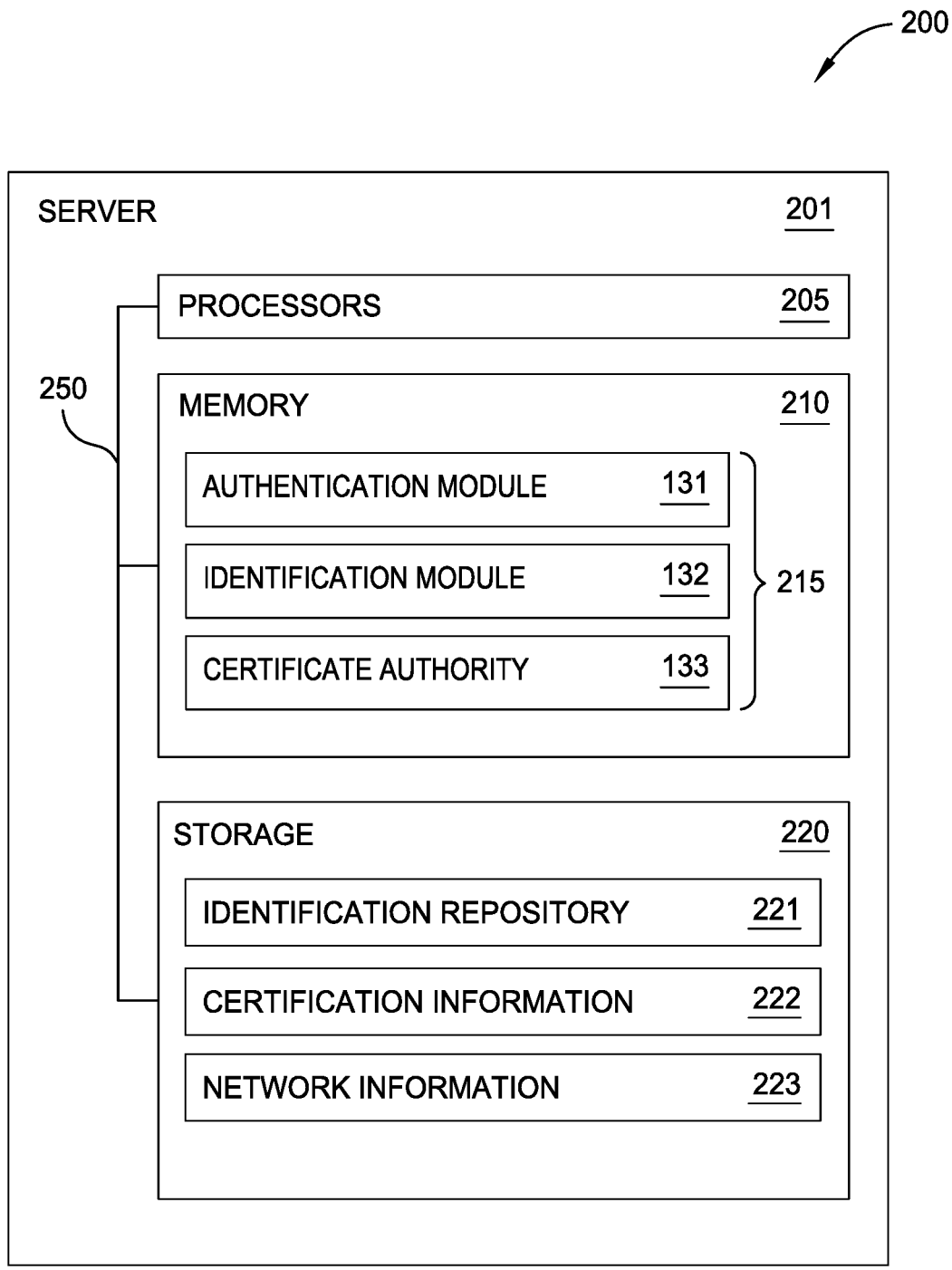
FIG. 2 is a block diagram of a server to provide for connecting a user device to a protected network, according to one embodiment.

FIG. 2 illustrates a block diagram of a server for connecting a user device to a protected network, according to one embodiment. As shown in FIG. 2, the arrangement 200 may include a server embodied as server/computer/router or authentication server (server 201) which executes the functions of the system 130 shown in FIG. 1, and perform the methods described herein. The server 201 is shown in the form of a general-purpose computing device. The components of server 201 may include, but are not limited to, one or more processors or processing units 205, a system memory 210, a storage system 220, a bus 250 that couples various system components including the system memory 210 and storage system 220 to processors 205 along with an external network interface and input/output interface. In some embodiments, arrangement 200 is distributed and includes a plurality of discrete computing devices that are connected through wired or wireless networking.

Memory 210 may include a plurality of program modules 215 for performing various functions related to connecting a user device to a protected network, described herein. The modules 215 generally include program code that is executable by one or more of the processors 205. As shown, modules 215 include authentication module 131, identification module 132, and certificate authority 133. In some examples, the modules 215 may be distributed and/or cloud based applications/modules. Additionally, storage system 220 may include media for storing identification repository 221, certification information 222, network information 223, and other information. The information stored in storage system 220 may be updated and accessed by the program modules 215 described herein.

Figure 3:
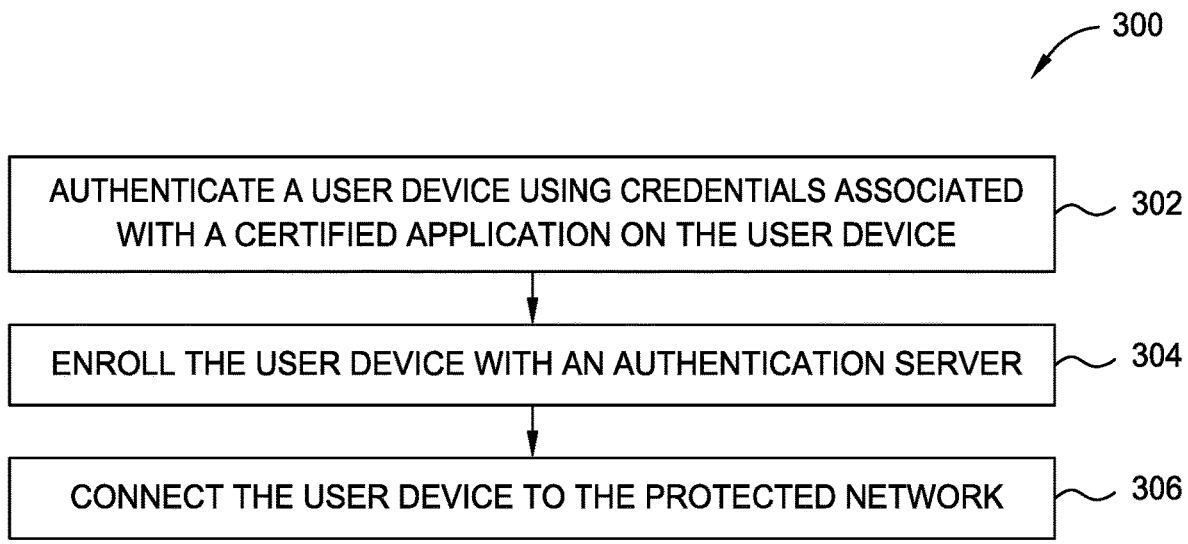
FIG. 3 is a method for connecting a user device to a protected network, according to one embodiment.

FIG. 3 is a method for connecting a user device to a protected network, according to one embodiment. Method 300 begins at block 302 where the system 130, including authentication and identification modules 131 and 132 and certificate authority 133, authenticates the user device 110, at an authentication server, such as server 201, using credentials associated with a certified application 115 on the user device 110. In some examples, the credentials include a username and password to access the certified application 115. For example, the username and password for an employee account or consumer account (e.g., a loyalty program or discount program, etc.). Further examples of this block in method 300 are discussed in relation to FIGS. 4A-7 below. In one example, the authentication of the user device can be completed before a network connection to the protected network 120 is attempted, such as described in relation to FIGS. 6A and 6B. In another example, the authentication of the user device is completed in conjunction or simultaneously with a connection attempt to the protected network 120 such as described in relation to FIGS. 4A and 4B.

Method 300 continues at block 304, where the system 130, including authentication and identification modules 131 and 132 and certificate authority 133, enrolls the user device with the authentication server 201 and issues an identity certificate to the user device 110. In general this block provides for providing an identity certificate to the user device 110 from the certificate authority 133, once it has been authenticated. In some examples, the identity certificate is used by the user device to authenticate the user device in subsequent attempts to connect to the protected network. The identity certificate is used by the user device as an alternative, stronger authentication credential in subsequent attempts to connect to the protected network. In some examples, the enrollment process can also be completed before a network connection to the protected network 120 is attempted, such as described in relation to FIGS. 6A and 6B. In another example, the enrollment of the user device is completed in conjunction or simultaneously with a connection attempt to the protected network 120. While described herein as a component of the system 130 (and authentication server 201), the certificate authority 133 may also include an independent certificate authority apart from the system 130, where the independent certificate authority can also issue and/or sign identity certificates to the user device.

Method 300 continues at block 306, where the system 130, including authentication and identification modules 131 and 132, connects the user device to the protected network, upon authenticating the user device. In some examples described herein, the connection of the user device 110 to the protected network 120 is accomplished by sending or transmitting a request message to the protected network 120. The protected network 120 then provides an accept message to allow the network connection to the user device in response to receiving the request message.

Figure 4A:
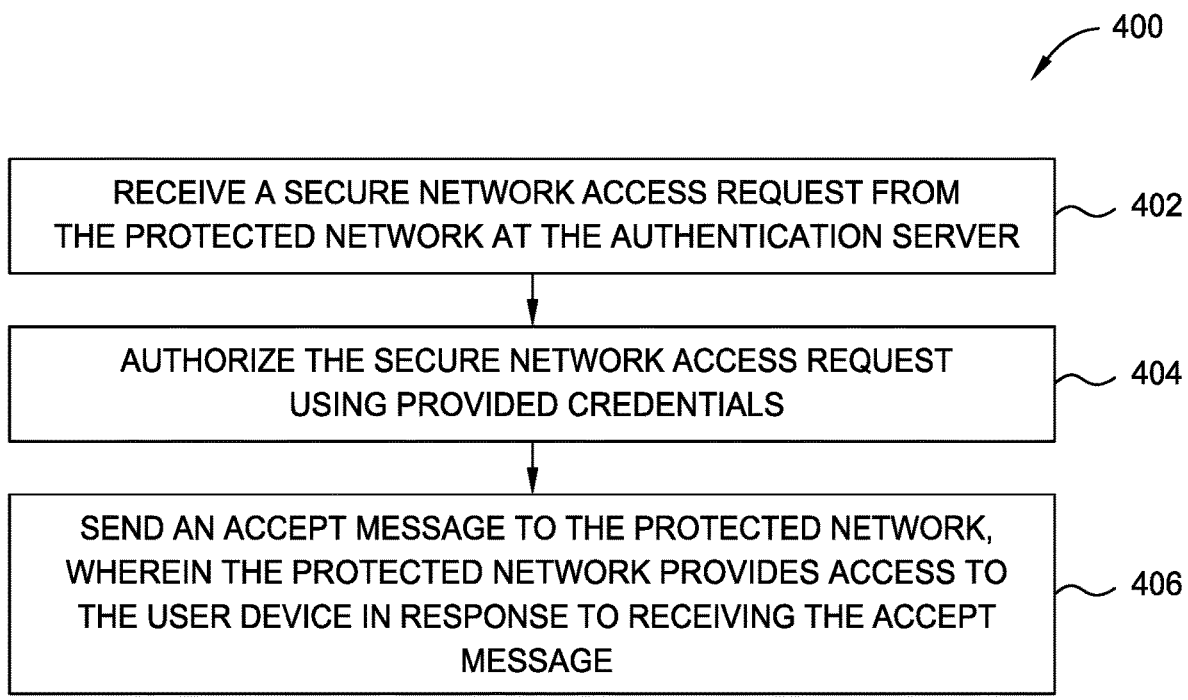
FIGS. 4A-4B are methods for connecting a user device to a protected network, according to one embodiment.
Figure 4B:
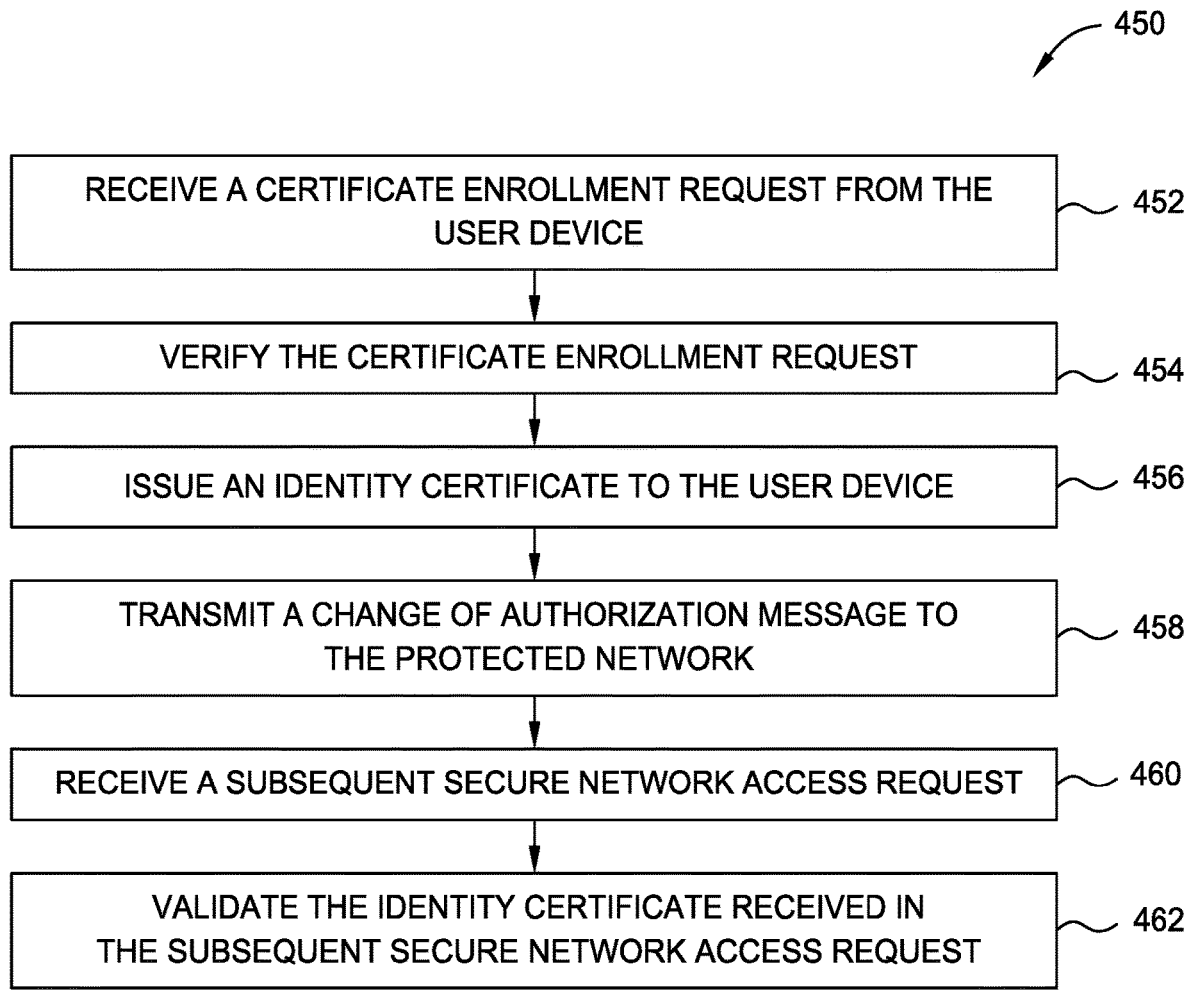

FIGS. 4A-4B are methods for connecting a user device to a protected network, according to one embodiment. The methods described in FIGS. 4A-4B are related to embodiments for configuring the certified application with connection credentials subsequent to receiving a secure network access request from the protected network. As described herein, the methods 400 and 450 also correspond to various steps in FIG. 5, which illustrates a system flow diagram for connecting a user device to a protected network, according to one embodiment. As such, the methods 400 and 450 are discussed in parallel with FIG. 5.

Figure 5:
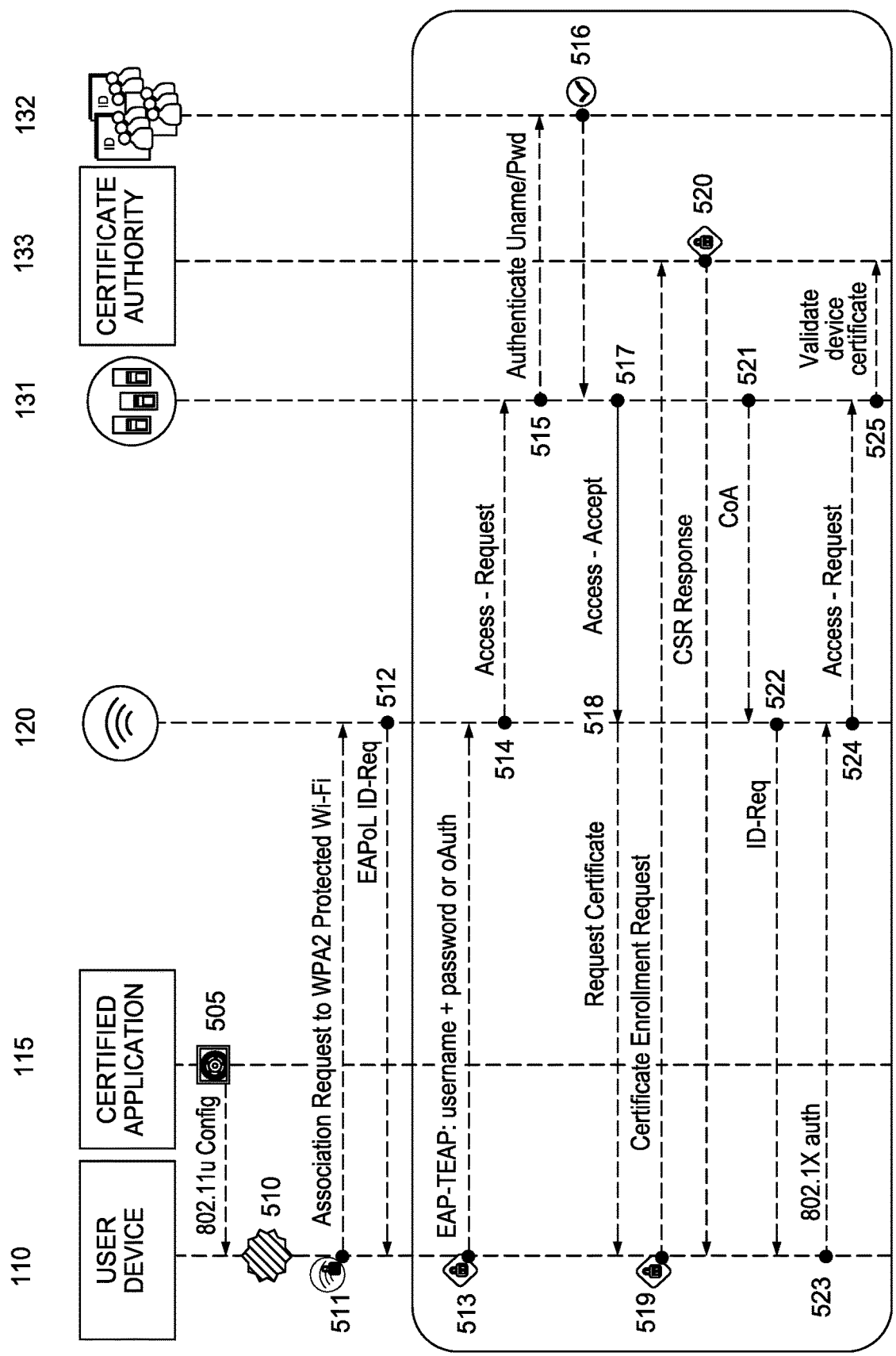
FIG. 5 illustrates a system flow diagram for connecting a user device to a protected network, according to one embodiment.

Method 400 is generally related to method 300 shown in FIG. 3 and further includes configuring the certified application with connection credentials subsequent to receiving secure network access request from the protected network 120. As shown in FIG. 5, an installed certified application 115 updates/installs a set of network connection information on the user device 110. In some examples, the installed certified application 115 has received credentials associated with the certified application from a user including a login name (username) and password. The installed certified application 115 then uses the credentials associated with the certified application and a set of other information including a Wi-Fi SSID for the protected network 120, a set of trusted Extensible Authentication Protocol (EAP) Certificates and defined EAP types (e.g., Tunnel Extensible Authentication Protocol (TEAP)) preinstalled on the certified application to update/install the network connection information at step 505 and step 510. In some examples, the network connection information includes: an identification of SSIDs to join, an identification of which certificates to trust in order to establish a link and send protected credentials, which EAP type to use (e.g., TEAP); and what credential (username/password) to send. The certified application installing this information prevents the user from having to accept certificates and/or other confusing screens with which the user would have to interact when logging directly into protected network 120 and installing the certifications manually.

Once the network connection information on user device 110 has been configured with the credentials associated with the certified application 115, the user device sends an association request to the protected network 120 at step 511. In some examples, the association request is 802.11 association request. The protected network responds to the association request with an identity request at step 512. In some examples, the identity request comprises an EAP over local area network (LAN) (EAPoL) identity request.

As shown at step 513, the user device 110 responds to the identity request from the protected network 120 with the credentials associated with the certified application 115. In some examples, this includes sending a username and password associated with the certified application using the EAP-TEAP protocol. In another example, the credentials associated with the certified application 115 may be sent as an open authorization (OAuth) type token and/or utilize any other EAP type to the protected network 120.

Method 400 then begins at block 402 where the system 130, including authentication module 131, receives a secure network access request from the protected network 120 at the authentication server, such as authentication module 131. For example, as shown in step 514 of FIG. 5, the protected network 120 may send a secure network access request to the authentication module 131. In some examples, such as when the authentication module 131 is embodied as a RADIUS server, the secure network access request is a RADIUS access request. In some examples, the authentication module may function as another type of Authentication, Authorization, and Accounting (AAA) server, where the secure network access request uses another format for the access request. In some examples, the secure network access request includes the credentials associated with the certified application received from the user device 110 at the protected network 120, such described in relation to step 513. As also shown in FIG. 5, the secure network access request at step 514 is transmitted from the protected network in response to an association request from the user device, shown in steps 511 and 513.

Method 400 continues at block 404, where the system 130, including authentication and identification modules 131 and 132, authorizes the user device 110 and the secure network access request by verifying the secure network access request using stored user information associated with an identification repository 221 and the credentials associated with the certified application. For example, as shown in step 515 and step 516 of FIG. 5, the authentication module 131 sends the credentials received in the secure network access request (e.g., a user name and password) to the identification module 132, which verifies the information with stored with an identification repository 221. In some examples, the credentials (e.g., username and password) are checked to verify a match. In some examples, a password may be hashed, where the hashed is also verified by the identification module 132.

Upon authenticating the user device 110, method 400 continues at block 406, where the system 130, including authentication module 131, sends an accept message to the protected network 120. For example, as shown in step 517, the authentication module 131 sends an accept message to the protected network 120. In some examples, the accept message comprises a RADIUS access-accept message. Upon receiving the accept message, the protected network 120 provides a network connection to the user device 110.

In some examples, the system 130, including authentication module 131 may also request additional authentication information and/or initiate a certificate enrollment process for the user device 110 as shown in step 518. For example, the system 130, including authentication module 131 may send a command to the user device 110 to request a certificate, in the form of an EAP-TEAP control message. In turn, user device 110 sends a certificate signing request to the certificate authority 133 at step 519. In some examples, the certificate enrollment request is Enrollment over Secure Transport (EST) certificate enrollment request sent through an EAP-TEAP control channel to the certificate authority 133.

Like method 400, method 450 in FIG. 4B is generally related to method 300 shown in FIG. 3 and further includes configuring the certified application with connection credentials subsequent to receiving a secure network access request from the protected network 120, including enrolling the certified application on the user device with an identity certificate. In some examples, method 450 is a continuation of method 400 described in relation to FIG. 4A. Method 450 then begins at block 452 where the system 130, including authentication module 131, receives a certificate enrollment request from the user device at the certificate authority 133. For example, the certificate enrollment request sent at step 519 in FIG. 5 is received by the certificate authority 133. As shown in FIG. 5, block 452 occurs subsequent to connecting the user device 110 to the protected network 120. In some examples, the certificate enrollment request is authenticated by passing through a control channel of an authenticated session (e.g., utilizing the control channel set up by the authenticated user credentials in steps 513-518.)

At block 454, method 450 continues, where the system 130, including certificate authority 133, verifies the certificate enrollment request at the authentication server by verifying the request has come through an authenticated control channel. Upon verification of the certificate enrollment request, method 450 continues at block 456, where the system 130, including the certificate authority 133, issues an identity certificate to the user device. In some examples, the authentication module may issue the identity certificate by transmitting an EST certificate signing request (CST) response, such as shown at step 520 in FIG. 5.

At block 458, method 450 continues, where the system 130, including authentication module 131, transmits a change of authorization message to the protected network 120. For example, as shown in step 521 of FIG. 5, the authentication module 131 transmits a RADIUS change of authorization message to the protected network 120. In response to receiving the change of authorization message, the protected network 120 sends an EAPoL identity request to the user device 110, as shown in step 522 of FIG. 5.

Method 450 further continues at block 460, where the system 130, including authentication module 131, receives a subsequent secure network access request from the protected network 120. For example, as shown at step 523 of FIG. 5, the user device sends a new identity message including the identity certificate to the protected network 120. The protected network, at step 524, sends another RADIUS access-request with the updated connection credentials (the identity certificate) to the authentication module 131. In some examples, the changed identity message from the user device 110 may comprise an 802.1X auth message including an EAP-TEAP TLS inner method, including the identity certificate of the user device 110.

Method 450 continues at block 462, where the system 130, including authentication module 131, identification module 132 and certificate authority 133, validate the identity certificate received in the secure access request. For example as shown in FIG. 5 step 524, the authentication module 131 verifies that the identity certificate is not-expired and is signed by a trusted certificate authority. In some examples, once the user device 110 is enrolled with the system 130, the identity certificate and set of trusted servers (such as EAP servers) is renewed and updated by the system 130 using TEAP processes. In some examples, this information may be stored as certificate information 222 and network information 223.

Figure 6A:
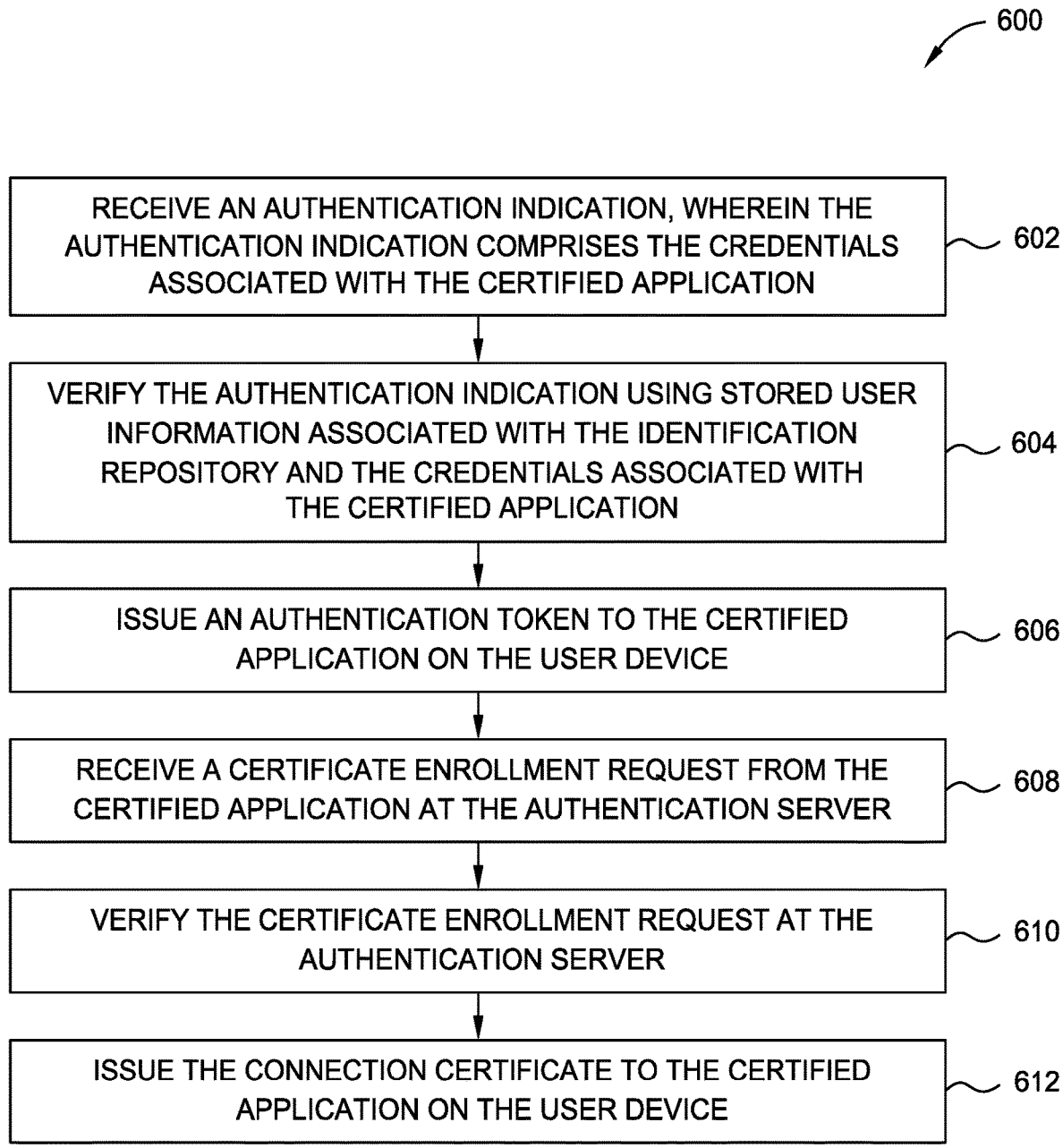
FIGS. 6A-6B are methods for connecting a user device to a protected network, according to one embodiment.
Figure 6B:
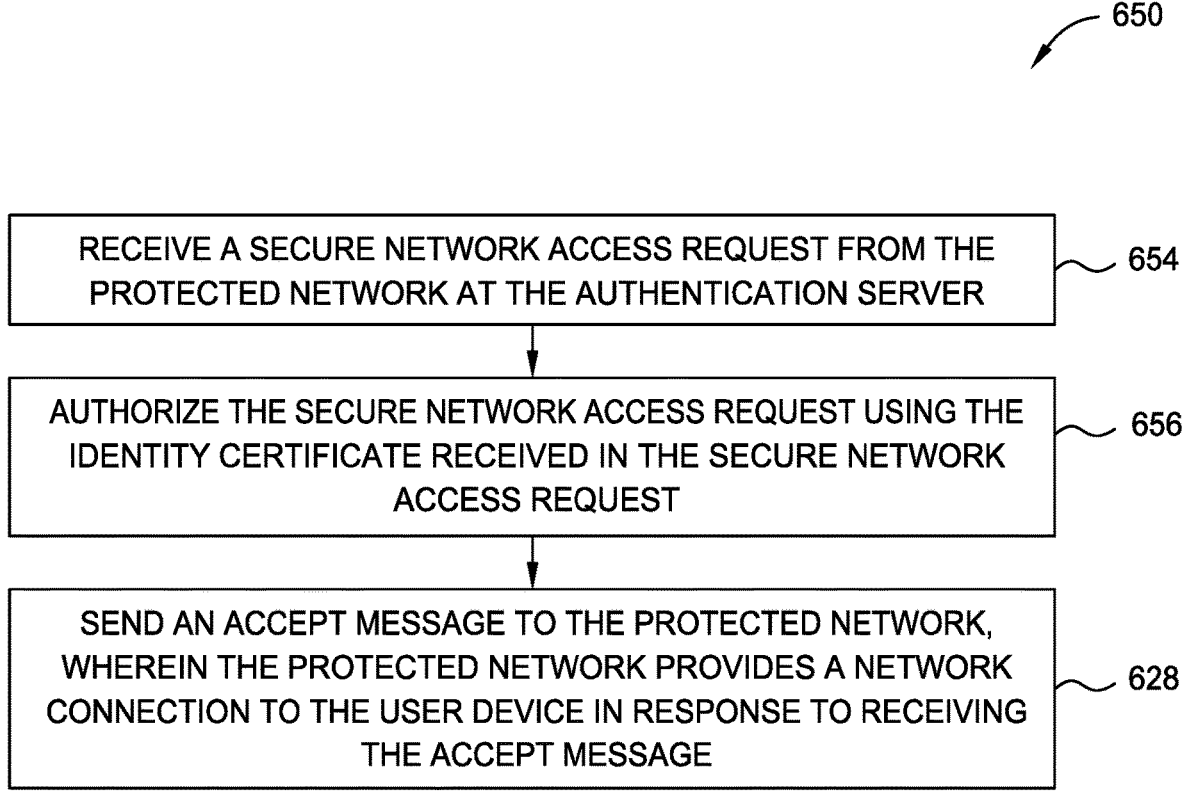

FIGS. 6A-6B are methods for connecting a user device to a protected network, according to one embodiment. The methods described in FIGS. 6A-6B are related to embodiments for preconfiguring the certified application with connection credentials prior to receiving a secure network access request from the protected network. As described herein, the steps of methods 600 and 650 also correspond to various steps in FIG. 7, which illustrates system flow diagram for connecting a user device to a protected network, according to one embodiment.

Method 600 is generally related to method 300 shown in FIG. 3 and further includes preconfiguring the certified application with an identity certificate prior to receiving a secure network access request. At step 701 in FIG. 7, a user enters credentials associated with the certified application 115 on the user device 110. For example, a user enters in employee information, loyalty program information, or other types of user identification information to log into the certified application 115.

Method 600 then begins at block 602 to authenticate the user device, where the system 130, including identification module 132, receives an authentication indication, wherein the authentication indication comprises the credentials associated with the certified application 115. For example, as shown at step 702 in FIG. 7, the certified application may send an authentication indication to the identification module 132. In some examples, the authentication indication may comprise an OAuth2 or other similar Application Authentication process protocol.

At block 604, the system 130, including identification module 132, verifies the authentication indication using stored user information associated with the identification repository 221 and the credentials associated with the certified application 115. Upon verification of the authentication indication, the system 130, including identification module 132, issues an authentication token to the certified application on the user device at block 606. For example, identification module 132 issues an OAuth token to the certified application as seen at step 703.

Figure 7:
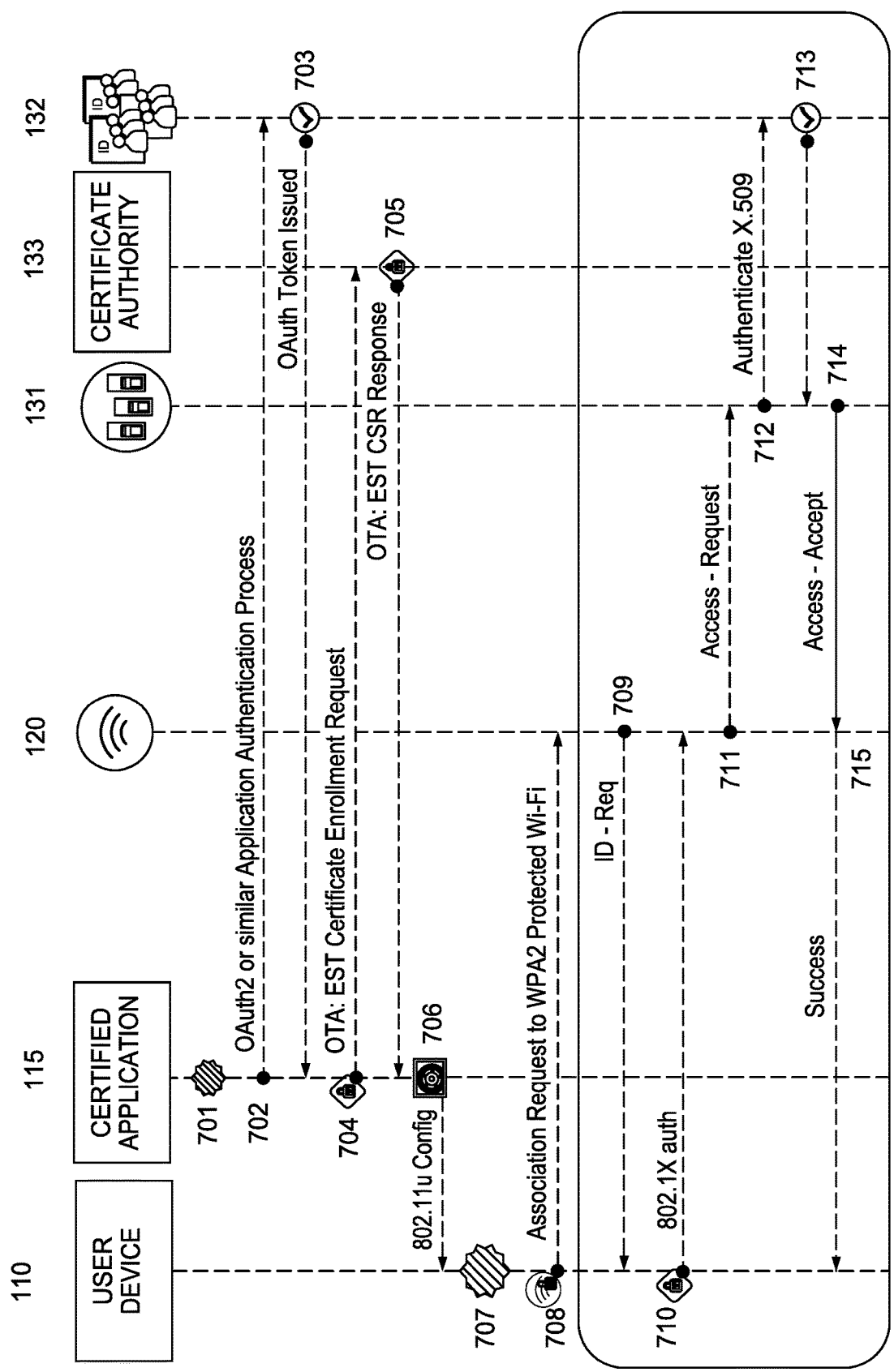
FIG. 7 illustrates a system flow diagram for connecting a user device to a protected network, according to one embodiment.

Method 600 continues at block 608, where system 130 enrolls the user device 110 by receiving a certificate enrollment request from the certified application 115 at the authentication server, such as authentication module 131. In some examples, the certificate enrollment request includes the issued authentication token. As shown in FIG. 7, once the certified application 115 receives the authentication token, the certified application 115 then begins a device enrollment process by sending an EST Certificate Enrollment Request to the authentication module 131 at step 704.

At block 610, the system 130, including authentication module 131, verifies the certificate enrollment request at the authentication server. In some examples, verification of the certificate enrollment request includes authenticating the communication from the certified application 115 via an oAuth2 type of authentication. Upon verification of the certificate enrollment request, method 600 continues at block 612, where the system 130, including the certificate authority 133, issues an identity certificate to the certified application 115 on the user device. In some examples, the certificate authority 133 may issue the identity certificate by transmitting an EST certificate signing request (CSR) response, such as shown at step 705 in FIG. 7. In some examples, during steps 702-705, the certified application 115 communicates with the certificate authority through other network 150, as described in FIG. 1, thus avoiding needing to connect through the protected network 120.

As shown in FIG. 7 at steps 706 and 707, the certified application 115 updates/installs a set of network connection information on the user device 110. In some examples, this set of network connection information includes a Wi-Fi SSID for the protected network 120, a set of trusted EAP Certs, and EAP type such as TEAP, and the identity certificate received from the system 130, in order to utilize a certificate connection method to protected network 120. A step 708, the user device 110 sends an association request to the protected network 120. At step 709, protected network responds to the association request with an identity request. In some examples, the identity request comprises an EAPoL identity request.

Like method 600, method 650 in FIG. 6B is generally related to method 300 shown in FIG. 3. In some examples, method 650 is a continuation of method 600 described in relation to FIG. 6A. In some examples, the protected network 120 receives an 802.1x authentication response from the user device in response to the identity request in step 09. In some examples, the authentication response uses a TLS Inner method shown in step 710 of FIG. 7. The authentication response includes the identity certificate issued to the certified application 115.

Method 650 begins at block 654, where the system 130, including authentication module 131, receives a secure network access request from the protected network 120 at the authentication server (authentication module 131). In some examples, such as shown in step 711 in FIG. 7, the secure network access request is transmitted from the protected network 120 in response to receiving the identity certificate in the form of the authentication response from the user device 110. In some examples, the secure network access request is a RADIUS access request including the identity certificate.

At block 656, method 650 continues, where the system 130, including authentication module 131, identification module 132, authorizes the secure network access request using the identity certificate received in the secure network access request. For example, as shown in steps 712 and 713 of FIG. 7, the authentication module 131 and the identification module 132 in association with identification repository 221 and certification information 222 authorizes the secure network access request. In some examples, the authorization process is an X.509 standard process. —In an example where the authorization fails, the system 130 issues a Reject or Fail message.

Method 650 continues at block 658, where the system 130, including authentication module 131, sends a accept message to the protected network 120. In some examples, the protected network 120 then provides a network connection to the user device 110 in response to receiving the accept message. For example, at step 714, the authentication module 131 sends a accept message such as a RADIUS Access-Accept message. In turn at step 715, the protected network 120 sends an EAP success message to the user device 110, providing the network connection.

Figure 8:
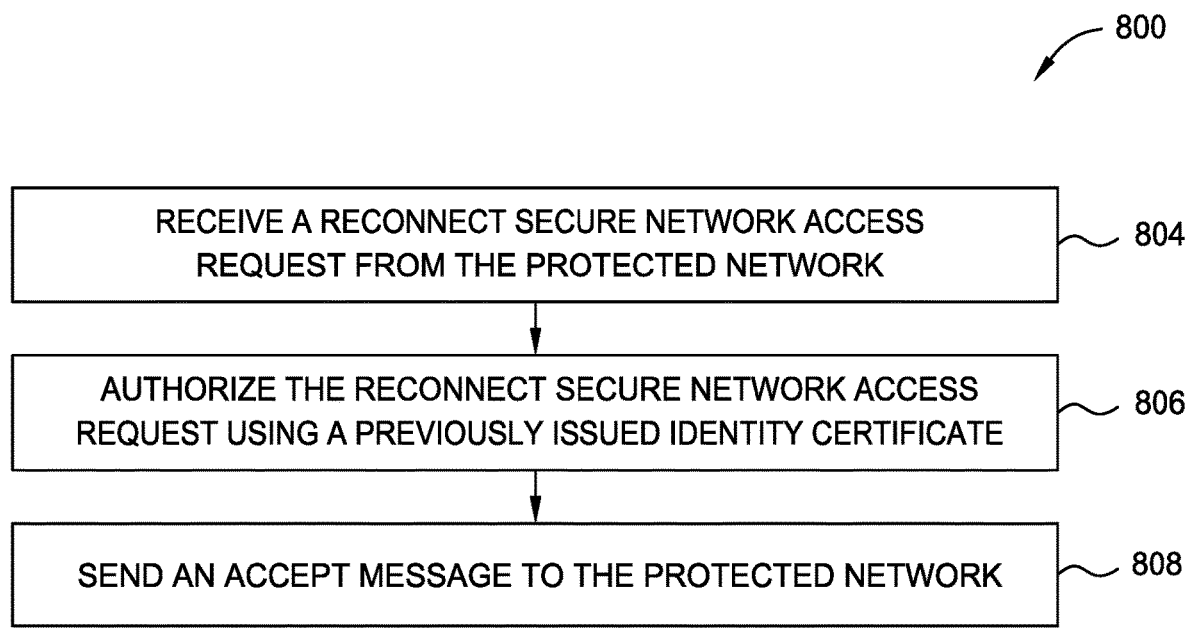
FIG. 8 is a method for reconnecting a user device to a protected network, according to one embodiment.

FIG. 8 is a method for reconnecting a user device to a protected network, according to one embodiment. The method described in FIG. 8 is related to embodiments for reconnecting a user device 110 after an identity certificate has been successfully installed as described in relation to both FIGS. 4A-5, and in FIGS. 6A-7. As described herein, the steps of method 800 also correspond to various steps in FIG. 9, which illustrates a system flow diagram for reconnecting a user device to a protected network, according to one embodiment.

Figure 9:
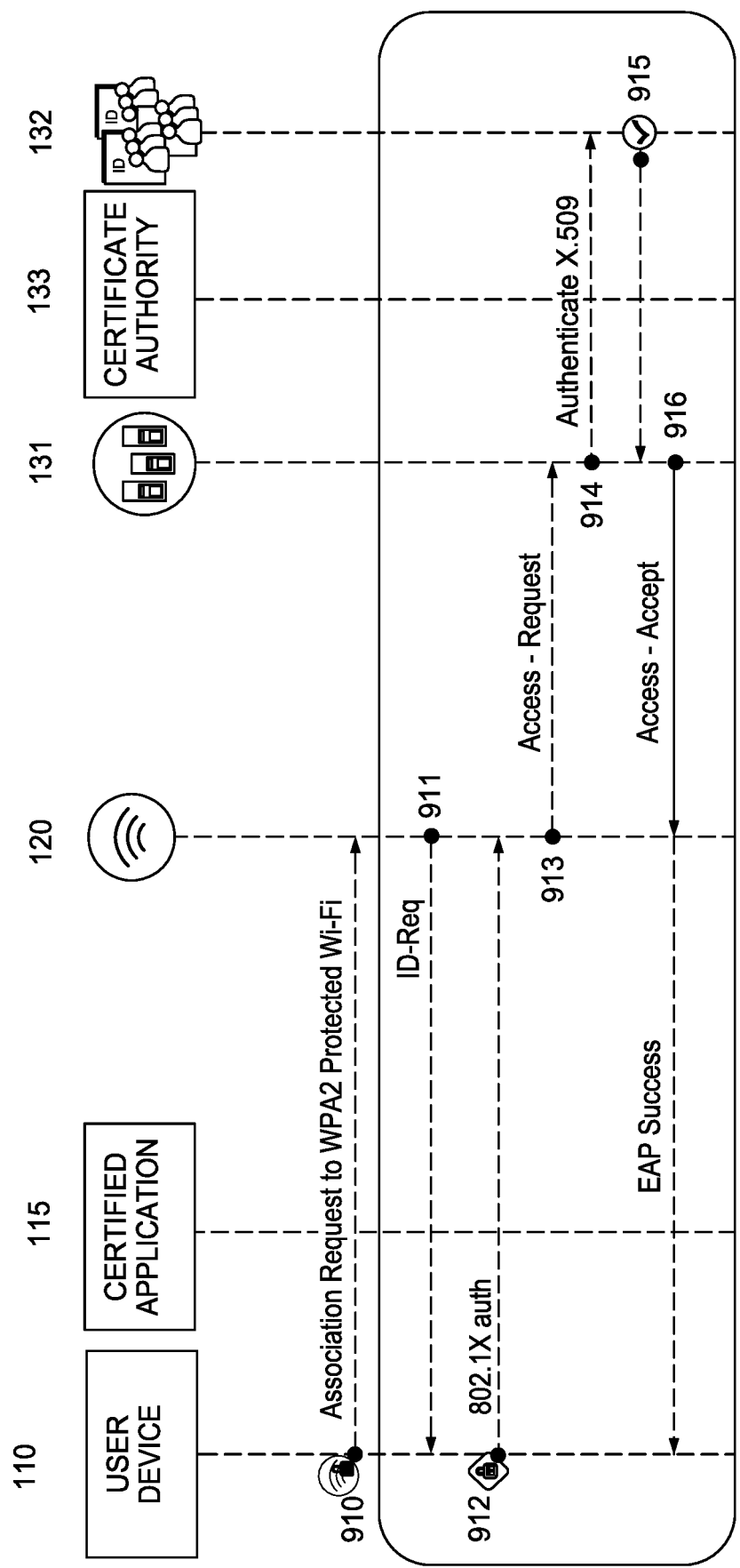
FIG. 9 illustrates a system flow diagram for reconnecting a user device to a protected network, according to one embodiment.
Figure 6B:
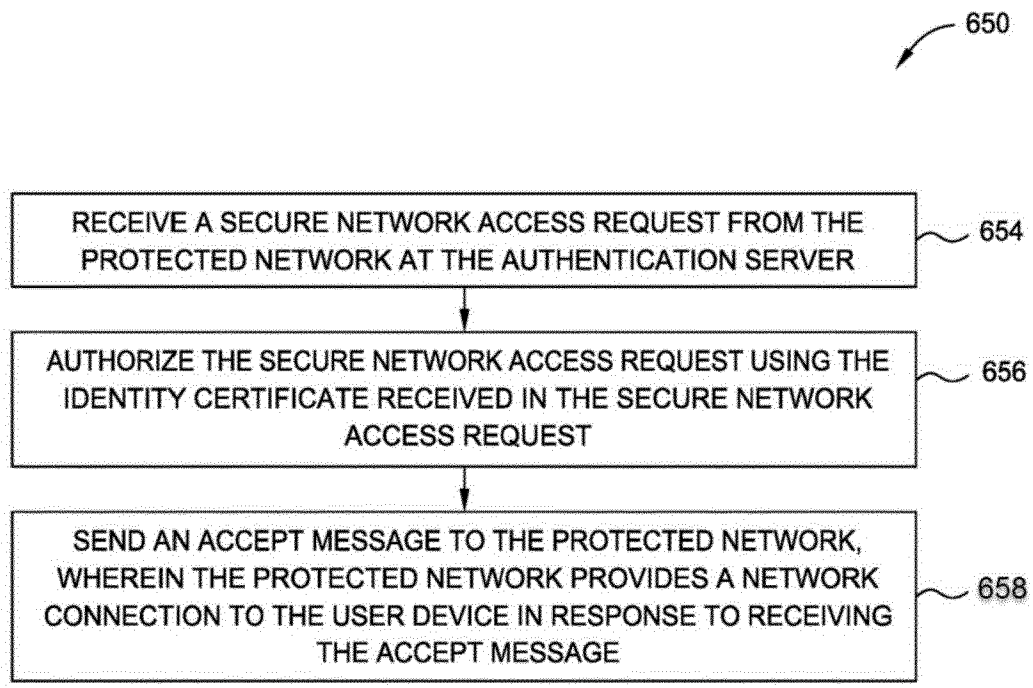

In some examples, such as through a TLS Inner method shown in step 912 of FIG. 9, the subsequent authentication response from the user device 110 comprises the identity certificate issued to the certified application 115. In some examples, the authentication response is transmitted from the user device in response to an identity request (e.g., an EAPoL identity request) from the protected network 120, such as shown in step 911, which is in response to an association request from the user device 110 as shown in step 910.

Method 800 begins at block 804, where the system 130, including authentication module 131, receives a reconnect secure network access request (e.g., a RADIUS access request shown in step 913 of FIG. 9) from the protected network 120 at the authentication server (authentication module 131). In some examples, the subsequent secure network access request includes the identity certificate received from the user device 110 received in step 912.

Method 800 continues at block 806, where the system 130, including authentication module 131 and identification module 132, authorizes the reconnect secure network access request using a previously issued identity certificate (i.e., the identity certificate received from the user device 110 in step 912), such as the identity certificate issued to the user device in relation to FIGS. 4A-7. Upon authorizing the reconnect secure network access request (such as shown in steps 914 and 915 of FIG. 9), method 800 continues at block 808, where the system 130, including authentication module 131, sends an accept message to the protected network 120. In response to receiving the accept message the protected network 120 provides a network connection to the user such as shown in step 916 of FIG. 9. In an example where the identify certificate or other credential information is expired or invalid a reject message is issued, indicating an invalid credential.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As described above, including in relation to FIG. 2, various computing components may be included to perform the methods described herein. For example, bus 250 represents one or more of any of several types of bus structures, including a memory bus or memory controller, a peripheral bus, an accelerated graphics port, and a processor or local bus using any of a variety of bus architectures. In some examples, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Further, server 201 typically includes a variety of computer system readable media. Such media may be any available media that is accessible by server 201, and it includes both volatile and non-volatile media, removable and non-removable media.

System memory 210 can include computer system readable media in the form of volatile memory, such as random access memory (RAM) and/or cache memory. Server 201 may further include other removable/non-removable, volatile/non-volatile computer system storage media. In some examples, storage system 220 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 250 by one or more data media interfaces.

As depicted and described above, memory 210 may include at least one program product having a set (e.g., at least one) of program modules 215 that are configured to carry out the functions of embodiments of the invention. Server 201 may further include other removable/non-removable volatile/non-volatile computer system storage media. In some examples, storage system 220 may be included as part of memory 210 and may typically provide a non-volatile memory for the networked computing devices, and may include one or more different storage elements such as Flash memory, a hard disk drive, a solid state drive, an optical storage device, and/or a magnetic storage device.

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet.

The flowchart and block diagrams in the Figs. illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for connecting a user device to a protected network comprising:
preconfiguring a certified application on the user device with an open authorization token via a first connection to the user device established on a first network, wherein the first network is a different network from the protected network;
receiving a secure network access request for the user device from the protected network at an authentication server;
authenticating the user device, at the authentication server, using the open authorization token installed by the preconfigured certified application on the user device and received from the user device; and
upon authenticating the user device using the open authorization token:
connecting the user device to the protected network;
establishing an authenticated control channel to the user device based on the using the open authorization token associated with the certified application;
enrolling the user device by verifying a certificate enrollment request from the user device at a certificate authority is received from the user device via the authenticated control channel; and
issuing an identity certificate to the user device, where the identity certificate is used by the user device to authenticate the user device in subsequent attempts to connect to the protected network.

2. The method of claim 1, further comprising:
preconfiguring the certified application with the identity certificate prior to receiving the secure network access request, wherein authenticating the user device comprises:
receiving an authentication indication, wherein the authentication indication comprises credentials associated with the certified application;
verifying the authentication indication using stored user information associated with an identification repository and the credentials associated with the certified application; and
upon verification of the authentication indication, issuing an authentication token to the certified application on the user device; and
wherein enrolling the user device comprises:
receiving the certificate enrollment request from the certified application at the certificate authority, wherein the certificate enrollment request comprises the issued authentication token; and
upon verification of the certificate enrollment request, issuing the identity certificate to the certified application on the user device.

3. The method of claim 2, wherein connecting the user device to the protected network comprises:
- receiving the secure network access request from the protected network at the authentication server, wherein the secure network access request is transmitted from the protected network in response to an association request and identification from the user device, and wherein the secure network access request comprises the identity certificate issued to the certified application;
- authorizing the secure network access request using the identity certificate received in the secure network access request; and
- sending an accept message to the protected network, wherein the protected network provides a network connection to the user device in response to receiving the accept message.

4. The method of claim 1, further comprising configuring the user device with connection credentials subsequent to receiving the secure network access request from the protected network, wherein connecting the user device to the protected network comprises:
- receiving the secure network access request from the protected network at the authentication server, wherein the secure network access request is transmitted from the protected network in response to an association request and identification from the user device, and wherein the secure network access request comprises the credentials associated with the certified application received from the user device at the protected network;

wherein authenticating the user device comprising the certified application comprises:
- authorizing the secure network access request using stored user information associated with an identification repository and the credentials associated with the certified application; and wherein connecting the user device to the protected network further comprises:
- sending an accept message to the protected network, wherein the protected network provides a network connection to the user device in response to receiving the accept message.

5. The method of claim 4, wherein enrolling the certified application on the user device with the authentication server comprises:
- subsequent to connecting the user device to the protected network, receiving the certificate enrollment request from the user device at the certificate authority and
- upon verification of the certificate enrollment request, issuing the identity certificate to the user device,
- transmitting a change authorization message to the protected network;
- receiving a subsequent secure network access request, wherein the subsequent secure network access request comprises the identity certificate; and
- validating the identity certificate received in the subsequent secure network access request.

6. The method of claim 1, further comprising:
- reconnecting the user device to the protected network by:
  - receiving a reconnect secure network access request from the protected network, wherein the reconnect secure network access request is transmitted from the protected network in response to an association request from the user device;
  - authorizing the reconnect secure network access request using a previously issued identity certificate; and
  - upon authorizing the reconnect secure network access request, sending a accept message to the protected network, wherein the protected network provides a network connection to the user device in response to receiving the accept message.

7. The method of claim 1, wherein the protected network comprises an enterprise network, wherein the enterprise network comprises a plurality of access points located in distinct locations.

8. A system for connecting a user device to a protected network, comprising:
- a processor; and
- a memory comprising instructions which, when executed on the processor, performs an operation, the operation comprising:
  - preconfiguring a certified application on the user device with an open authorization token via a first connection to the user device established on a first network, wherein the first network is a different network from the protected network;
  - receiving a secure network access request for the user device from the protected network at an authentication server;
  - authenticating the user device, at the authentication server, using the open authorization token installed by the preconfigured certified application on the user device and received from the user device; and
  - upon authenticating the user device using the open authorization token:
    - connecting the user device to the protected network;
    - establishing an authenticated control channel to the user device based on the open authorization token associated with the certified application; and
    - enrolling the user device by at least by verifying a certificate enrollment request from the user device at a certificate authority is received from the user device via the authenticated control channel; and
    - issuing an identity certificate to the user device, where the identity certificate is used by the user device to authenticate the user device in subsequent attempts to connect to the protected network.

9. The system of claim 8, wherein the operation further comprises:
- preconfiguring the certified application with the identity certificate prior to receiving the secure network access request, wherein authenticating the user device comprises:
  - receiving an authentication indication, wherein the authentication indication comprises credentials associated with the certified application;
  - verifying the authentication indication using stored user information associated with an identification repository and the credentials associated with the certified application; and
  - upon verification of the authentication indication, issuing an authentication token to the certified application on the user device; and
- wherein enrolling the user device comprises:
  - receiving the certificate enrollment request from the certified application at the certificate authority, wherein the certificate enrollment request comprises the issued authentication token; and upon verification of the certificate enrollment request, issuing the identity certificate to the certified application on the user device.

10. The system of claim 9, wherein connecting the user device to the protected network comprises:
receiving the secure network access request from the protected network at the authentication server, wherein the secure network access request is transmitted from the protected network in response to an association request and identification from the user device, and wherein the secure network access request comprises the identity certificate issued to the certified application;
authorizing the secure network access request using the identity certificate received in the secure network access request; and
sending an accept message to the protected network, wherein the protected network provides a network connection to the user device in response to receiving the accept message.

11. The system of claim 8, wherein the operation further comprises:
configuring the user device with connection credentials subsequent to receiving the secure network access request from the protected network, wherein connecting the user device to the protected network comprises:
receiving the secure network access request from the protected network at the authentication server, wherein the secure network access request is transmitted from the protected network in response to an association request and identification from the user device, and wherein the secure network access request comprises the credentials associated with the certified application received from the user device at the protected network;
wherein authenticating the user device comprising the certified application comprises:
authorizing the secure network access request using stored user information associated with an identification repository and the credentials associated with the certified application; and
wherein connecting the user device to the protected network further comprises:
sending an accept message to the protected network, wherein the protected network provides a network connection to the user device in response to receiving the accept message.

12. The system of claim 11, wherein enrolling the certified application on the user device with the authentication server comprises:
subsequent to connecting the user device to the protected network, receiving the certificate enrollment request from the user device at the certificate authority; and
upon verification of the certificate enrollment request, issuing the identity certificate to the user device;
transmitting a change authorization message to the protected network;
receiving a subsequent secure network access request, wherein the subsequent secure network access request comprises the identity certificate; and
validating the identity certificate received in the subsequent secure network access request.

13. The system of claim 8, wherein the operation further comprises:

reconnecting the user device to the protected network by:
receiving a reconnect secure network access request from the protected network, wherein the reconnect secure network access request is transmitted from the protected network in response to an association request from the user device;
authorizing the reconnect secure network access request using a previously issued identity certificate; and
upon authorizing the reconnect secure network access request, sending a accept message to the protected network, wherein the protected network provides a network connection to the user device in response to receiving the accept message.

14. The system of claim 8, wherein the protected network comprises an enterprise network, wherein the enterprise network comprises a plurality of access points located in distinct locations.

15. A computer program product for connecting a user device to a protected network, the computer program product comprising a non-transitory computer-readable medium program having program instructions embodied therewith, the program instructions executable by a processor to perform an operation comprising:
preconfiguring a certified application on the user device with an open authorization token via a first connection to the user device established on a first network, wherein the first network is a different network from the protected network;
receiving a secure network access request for the user device from the protected network at an authentication server;
authenticating the user device, at the authentication server, using the open authorization token installed by the preconfigured certified application on the user device and received from the user device; and
upon authenticating the user device using the open authorization token:
connecting the user device to the protected network;
establishing an authenticated control channel to the user device based on the open authorization token associated with the certified application; and
enrolling the user device by at least by verifying a certificate enrollment request from the user device at a certificate authority is received from the user device via the authenticated control channel; and
issuing an identity certificate to the user device, where the identity certificate is used by the user device to authenticate the user device in subsequent attempts to connect to the protected network.

16. The computer program product of claim 15, wherein the operation further comprises:
preconfiguring the certified application with the identity certificate prior to receiving the secure network access request, wherein authenticating the user device comprises:
receiving an authentication indication, wherein the authentication indication comprises credentials associated with the certified application;
verifying the authentication indication using stored user information associated with an identification repository and the credentials associated with the certified application; and
upon verification of the authentication indication, issuing an authentication token to the certified application on the user device; and wherein enrolling the user device comprises:
receiving the certificate enrollment request from the certified application at the certificate authority, wherein the certificate enrollment request comprises the issued authentication token; and
upon verification of the certificate enrollment request, issuing the identity certificate to the certified application on the user device.

17. The computer program product of claim 16, wherein connecting the user device to the protected network comprises:
receiving the secure network access request from the protected network at the authentication server, wherein the secure network access request is transmitted from the protected network in response to an association request and identification from the user device, and wherein the secure network access request comprises the identity certificate issued to the certified application;
authorizing the secure network access request using the identity certificate received in the secure network access request; and
sending an accept message to the protected network, wherein the protected network provides a network connection to the user device in response to receiving the accept message.

18. The computer program product of claim 15, wherein the operation further comprises:
configuring the user device with connection credentials subsequent to receiving the secure network access request from the protected network, wherein connecting the user device to the protected network comprises:
receiving the secure network access request from the protected network at the authentication server, wherein the secure network access request is transmitted from the protected network in response to an association request and identification from the user device, and wherein the secure network access request comprises the credentials associated with the certified application received from the user device at the protected network;
wherein authenticating the user device comprising the certified application comprises:
authorizing the secure network access request using stored user information associated with an identification repository and the credentials associated with the certified application; and
wherein connecting the user device to the protected network further comprises:
sending an accept message to the protected network, wherein the protected network provides a network connection to the user device in response to receiving the accept message.

19. The computer program product of claim 18, wherein enrolling the certified application on the user device with the authentication server comprises:
subsequent to connecting the user device to the protected network, receiving the certificate enrollment request from the user device at the certificate authority; and
upon verification of the certificate enrollment request, issuing the identity certificate to the user device;
transmitting a change authorization message to the protected network;
receiving a subsequent secure network access request, wherein the subsequent secure network access request comprises the identity certificate; and
validating the identity certificate received in the subsequent secure network access request.

20. The computer program product of claim 15, wherein the operation further comprises:
reconnecting the user device to the protected network by:
receiving a reconnect secure network access request from the protected network, wherein the reconnect secure network access request is transmitted from the protected network in response to an association request from the user device;
authorizing the reconnect secure network access request using a previously issued identity certificate; and
upon authorizing the reconnect secure network access request, sending a accept message to the protected network, wherein the protected network provides a network connection to the user device in response to receiving the accept message.

\* \* \* \* \*

UNITED STATES PATENT AND TRADEMARK OFFICE
CERTIFICATE OF CORRECTION

PATENT NO.         : 11,558,366 B2
APPLICATION NO.    : 16/172694
DATED              : January 17, 2023
INVENTOR(S)        : Aaron T. Woland et al.

It is certified that error appears in the above-identified patent and that said Letters Patent is hereby corrected as shown below:

In the Drawings

On sheet 7 of 10, in Figure 6B, Line 9, delete "628" and insert -- 658 -- as shown on the attached drawing sheet.

Signed and Sealed this
Ninth Day of May, 2023

Katherine Kelly Vidal
*Director of the United States Patent and Trademark Office*